United States Patent
Tang et al.

(10) Patent No.: US 9,008,247 B2
(45) Date of Patent: Apr. 14, 2015

(54) COMMUNICATION CIRCUITS AND COMMUNICATION DEVICES SUPPORTING MIMO AND DUAL-MODE TECHNIQUES

(71) Applicant: MediaTek Inc., Hsin-Chu (TW)

(72) Inventors: Wei-Cheng Tang, Zhubei (TW); Juiyuan Tsai, Tainan (TW); Pao-Cheng Chiu, New Taipei (TW)

(73) Assignee: MediaTek Inc., Hsin-Chu (TW)

( * ) Notice: Subject to any disclaimer, the term of this patent is extended or adjusted under 35 U.S.C. 154(b) by 77 days.

(21) Appl. No.: 13/912,847

(22) Filed: Jun. 7, 2013

(65) Prior Publication Data

US 2014/0362936 A1 Dec. 11, 2014

(51) Int. Cl.
*H04B 7/04* (2006.01)
*H04W 56/00* (2009.01)

(52) U.S. Cl.
CPC ......... *H04B 7/0413* (2013.01); *H04W 56/0015* (2013.01)

(58) Field of Classification Search
USPC .................. 375/347, 222, 260, 267, 299, 349
See application file for complete search history.

(56) References Cited

U.S. PATENT DOCUMENTS

| | | | |
|---|---|---|---|
| 2005/0227631 A1* | 10/2005 | Robinett | 455/83 |
| 2012/0230444 A1* | 9/2012 | Ravid et al. | 375/267 |
| 2012/0252511 A1* | 10/2012 | Trachewsky | 455/501 |
| 2014/0269865 A1* | 9/2014 | Aparin | 375/222 |

* cited by examiner

Primary Examiner — Kabir A Timory
(74) Attorney, Agent, or Firm — McClure, Qualey & Rodack, LLP

(57) ABSTRACT

A communication circuit and a communication device are provided. The communication circuit includes first, second, and third RF transceivers, first and second baseband transceivers, and first and second modem circuits. The first and second RF transceivers are configured to down-convert first and second RF signals for MIMO. The third RF transceiver is configured to down-convert a third RF signal for a second telecommunication technology. The first baseband transceiver is configured to digitize the down-converted first RF signal to output a first baseband signal. The second baseband transceiver is configured to digitize one of the down-converted second or third RF signals according to a selection signal to output a second baseband signal. The first modem circuit is configured to digitally process the first and second baseband signals using the MIMO technology. The second modem circuit is configured to digitally process the second baseband signal using the second telecommunication technology.

14 Claims, 5 Drawing Sheets

COMMUNICATION CIRCUITS AND COMMUNICATION DEVICES SUPPORTING MIMO AND DUAL-MODE TECHNIQUES

BACKGROUND OF THE INVENTION

1. Field of the Invention

The present invention relates to mobile communications, in particular for communication circuits and communication devices supporting Multiple-In and Multiple-Out (MIMO) and dual-mode techniques in mobile communications.

2. Description of the Related Art

Multiple-In and Multiple-Out (MIMO) technology is a breakthrough in wireless communication system design which resolves radio resource constraints on limited power and data bandwidth, as well as communication channel impairment. Dual-mode phones allow users to access more than one communication network with a single phone. A mobile phone incorporating the MIMO and dual-mode features brings users the benefits of increased transmission data capacity and increased network compatibility.

BRIEF SUMMARY OF THE INVENTION

A detailed description is given in the following embodiments with reference to the accompanying drawings.

An embodiment of a communication circuit is disclosed, comprising first, second, and third RF transceivers, first and second baseband transceivers, and first and second modem circuits. The first and second RF transceivers are configured to down-convert first and second RF signals for MIMO. The third RF transceiver is configured to down-convert a third RF signal for a second telecommunication technology. The first baseband transceiver, coupled to the first RF transceiver, is configured to digitize the down-converted first RF signal to output a first baseband signal. The second baseband transceiver, coupled to the second and third RF transceivers, is configured to digitize one of the down-converted second or third RF signals according to a selection signal to output a second baseband signal. The first modem circuit, coupled to the first and second baseband transceivers, is configured to digitally process the first and second baseband signals using the MIMO technology. The second modem circuit, coupled to the second baseband transceivers, is configured to digitally process the second baseband signal using the second telecommunication technology.

Another embodiment of a communication device is provided, comprising: first, second and third antennas and an IC. The first and second antennas are configured to receive first and second RF signals for a MIMO technology. The third antenna is configured to receive third RF signal for a second communication technology. The IC, coupled to the first, second and third antennas, comprises first, second and third RF transceivers, first and second baseband transceivers, and first and second modem circuits. The first and second RF transceivers are configured to down-convert first and second RF signals. The third RF transceiver is configured to down-convert a third RF signal. The first baseband transceiver, coupled to the first RF transceiver, is configured to digitize the down-converted first RF signal to output a first baseband signal. The second baseband transceiver, coupled to the second and third RF transceivers, is configured to digitize one of the down-converted second or third RF signals according to a selection signal to output a second baseband signal. The first modem circuit, coupled to the first and second baseband transceivers, is configured to digitally process the first and second baseband signals using the MIMO technology. The second modem circuit, coupled to the second baseband transceivers, is configured to digitally process the second baseband signal using the second telecommunication technology.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Various aspects are described herein in connection with a wireless terminal, which can also be referred to as a system, device, subscriber unit, subscriber station, mobile station, mobile, mobile device, remote station, remote terminal, access terminal, user terminal, terminal, communication device, user agent, user device, or user equipment (UE). The wireless terminal may be a cellular telephone, a satellite phone, a cordless telephone, a Session Initiation Protocol (SIP) phone, Personal Digital Assistant (PDA), a handheld device having wireless connection capability, a computing device, or other processing device connected to a wireless modem. Moreover, a base station described herein may be utilized for communicating with wireless terminal(s) and may also be referred to as an access point, a node B, or an evolved node B (eNB).

The techniques described herein may be used for various wireless communication systems such as Global System for Mobile Communications (GSM), General packet radio service (GPRS), Enhanced Data rates for GSM Evolution (EDGE), Universal Mobile Telecommunications System (UMTS), Code Division Multiple Access 2000 (CDMA2000), Enhanced Voice-Data Optimized (EVDO), High Speed Packet Access (HSPA), Worldwide Interoperability for Microwave Access (WiMAX), and LTE-Advanced (LTE-A).

Figure 1:
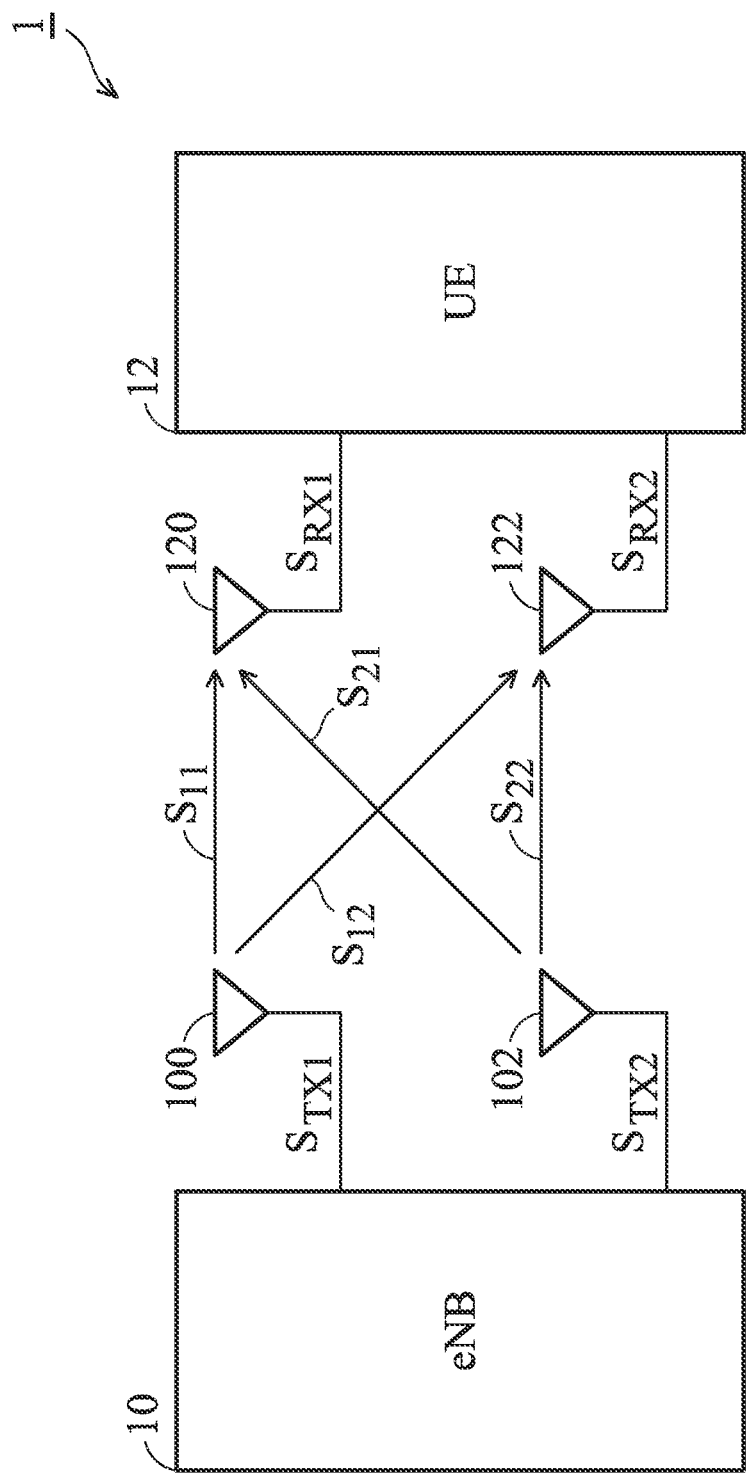
FIG. 1 shows a wireless communication device 10 supporting a MIMO technology.

FIG. 1 shows a wireless communication device 10 supporting a multiple-in and multiple-out (MIMO) technology, using multiple antennas as transmitters and receivers to create multiple data links which effectively increase the data rate, and/or add diversity to increase the signal quality of the communication. The communication system 1 is an LTE communication system which includes an evolved node B (eNB) 10 and UE 12, each including two antennas.

The eNB 10 is configured to transmit downlink signals $S_{TX1}$ and $S_{TX2}$ by two antennas 100 and 102 respectively, which are transmitted through an air interface by taking transmission paths S11, S12, S21, and S22 to be received by two antennas 120 and 122 at the UE 12. As a consequence, the antennas 120 and 120 receive signals $S_{RX1}$ and $S_{RX2}$, each being a mixed signal of the downlink signals $S_{TX1}$ and $S_{TX2}$, which may be separated back into the original signals $S_{TX1}$ and $S_{TX2}$ by a MIMO modem (not shown) in the UE 12.

The MIMO technology can increase the data rate to the UE 12, increasing the transmission capacity of the eNB 10.

Figure 2:
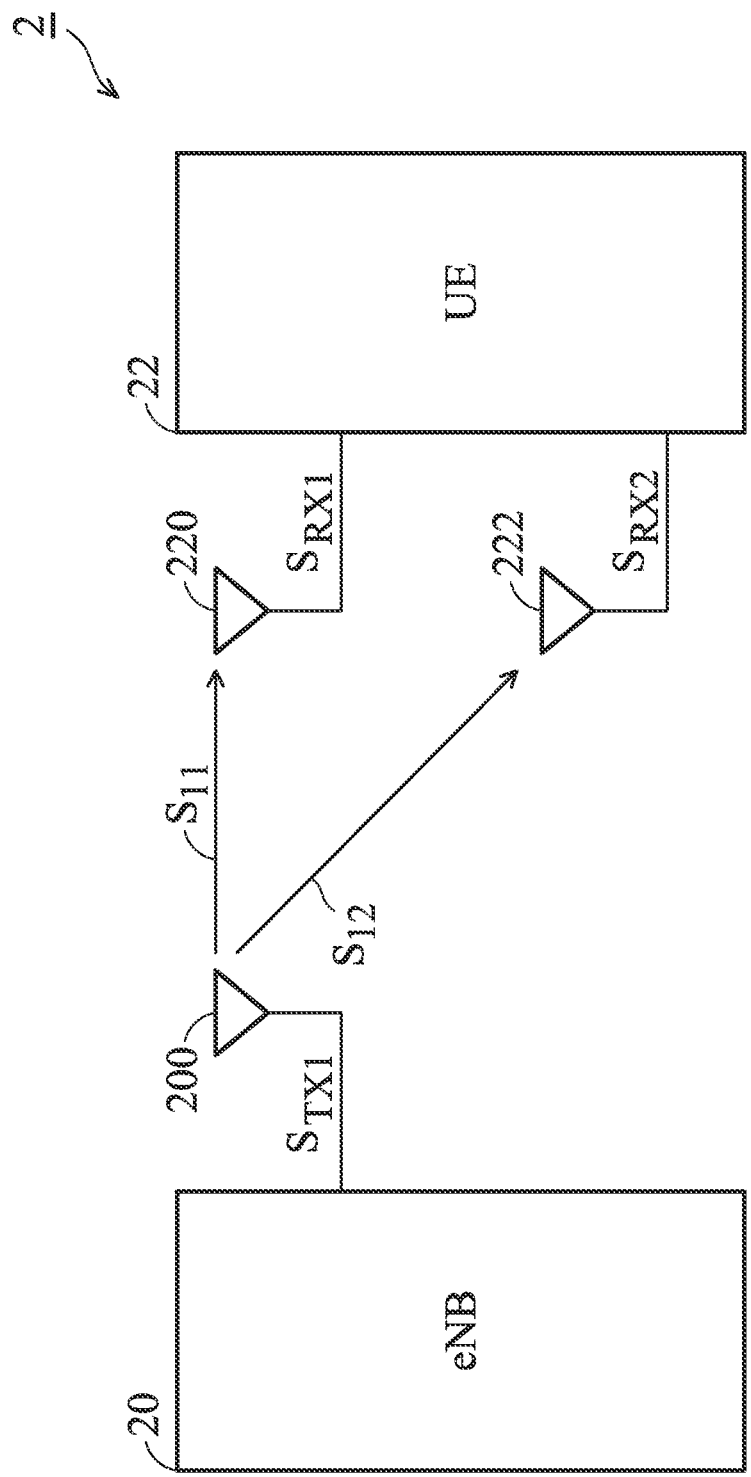
FIG. 2 illustrates a MIMO UE 22 with receive antenna diversity implemented thereon.

A MIMO device can also support antenna-diversity technology. FIG. 2 illustrates a MIMO UE 22 with the receive antenna diversity implemented thereon. The receive antenna diversity is a type of spatial diversity, involving the use of multiple antennas sufficiently well-separated at the receiver that signals traveling on the individual transmission paths experience effectively independent fading.

The UE 22 contains antennas 220 and 222, which can be utilized for the receive antenna diversity. The antennas 220 and 222 respectively receive signals $S_{RX1}$ and $S_{RX2}$ transmitted through transmission paths $S_{11}$ and $S_{12}$, which can be combined using appropriate signal processing techniques such as selection or maximal ratio combining techniques by a receive diversity modem (not shown) in the UE 22 to recover the original signal $S_{TX1}$.

The receive antenna diversity can mitigate the channel fading effects in space, increasing signal quality of the received signal at the MIMO device.

Figure 3:
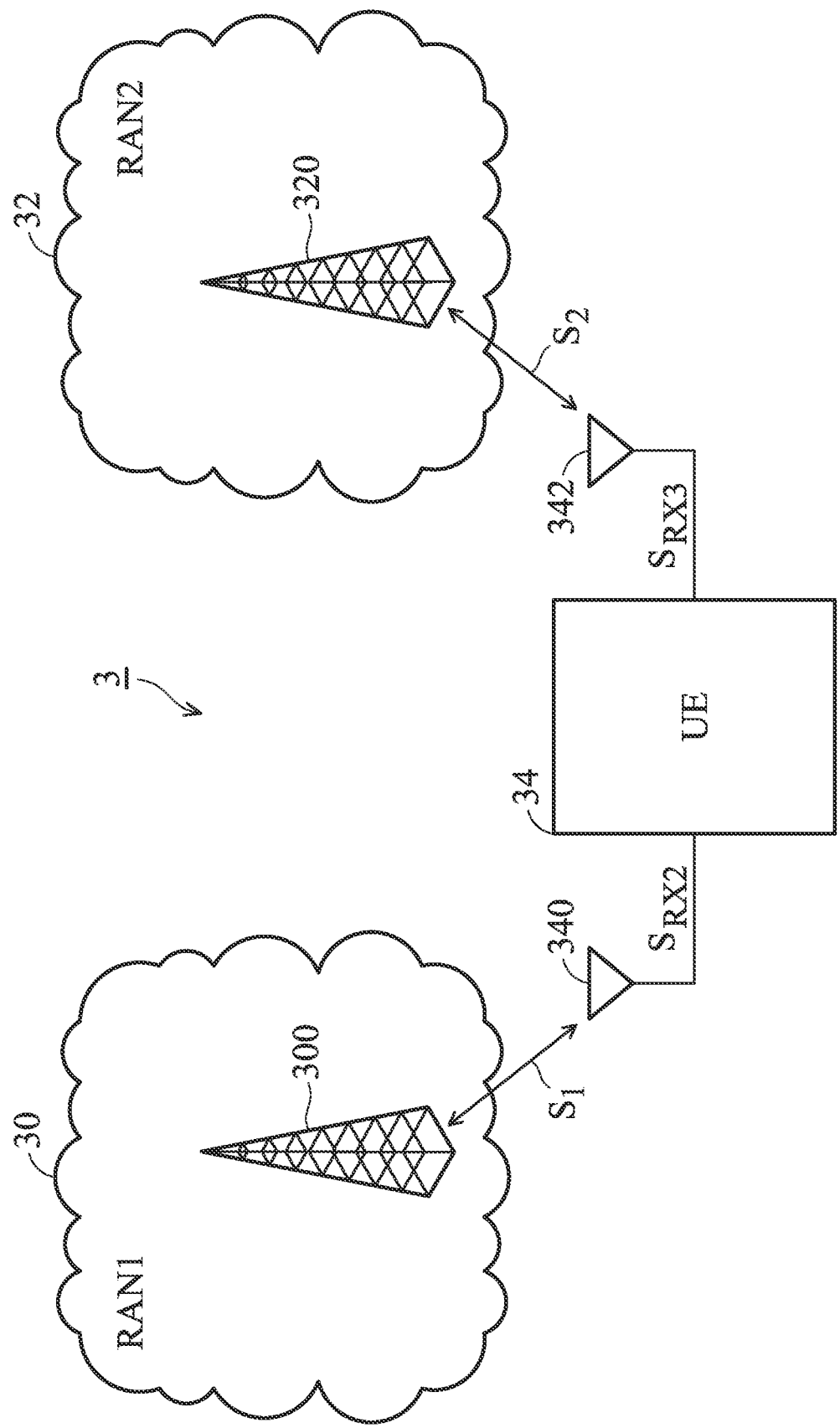
FIG. 3 illustrates an UE device 34 capable of providing a dual-mode communication service.

Dual-mode or dual-link is a desirable feature which allows a UE to acquire communication services through multiple communication networks, such as a 3G network and a WiFi network. FIG. 3 illustrates an UE device 34 capable of providing the dual-mode communication service from two different radio access networks RAN 30 and RAN 32, e.g., RAN 30 is a GSM RAN (GRAN) in a GSM network and RAN 32 is an Universal Terrestrial RAN (UTRAN) in a UMTS network. The UE 34 is configured to adopt GSM or UMTS communication network according to a user's preference. For example, the UE 34 is configured to communicate with the GRAN 30 in GSM signals S1 through antenna 340 and communicate with the UTRAN 32 in UMTS signals S2 through antenna 342.

Figure 4:
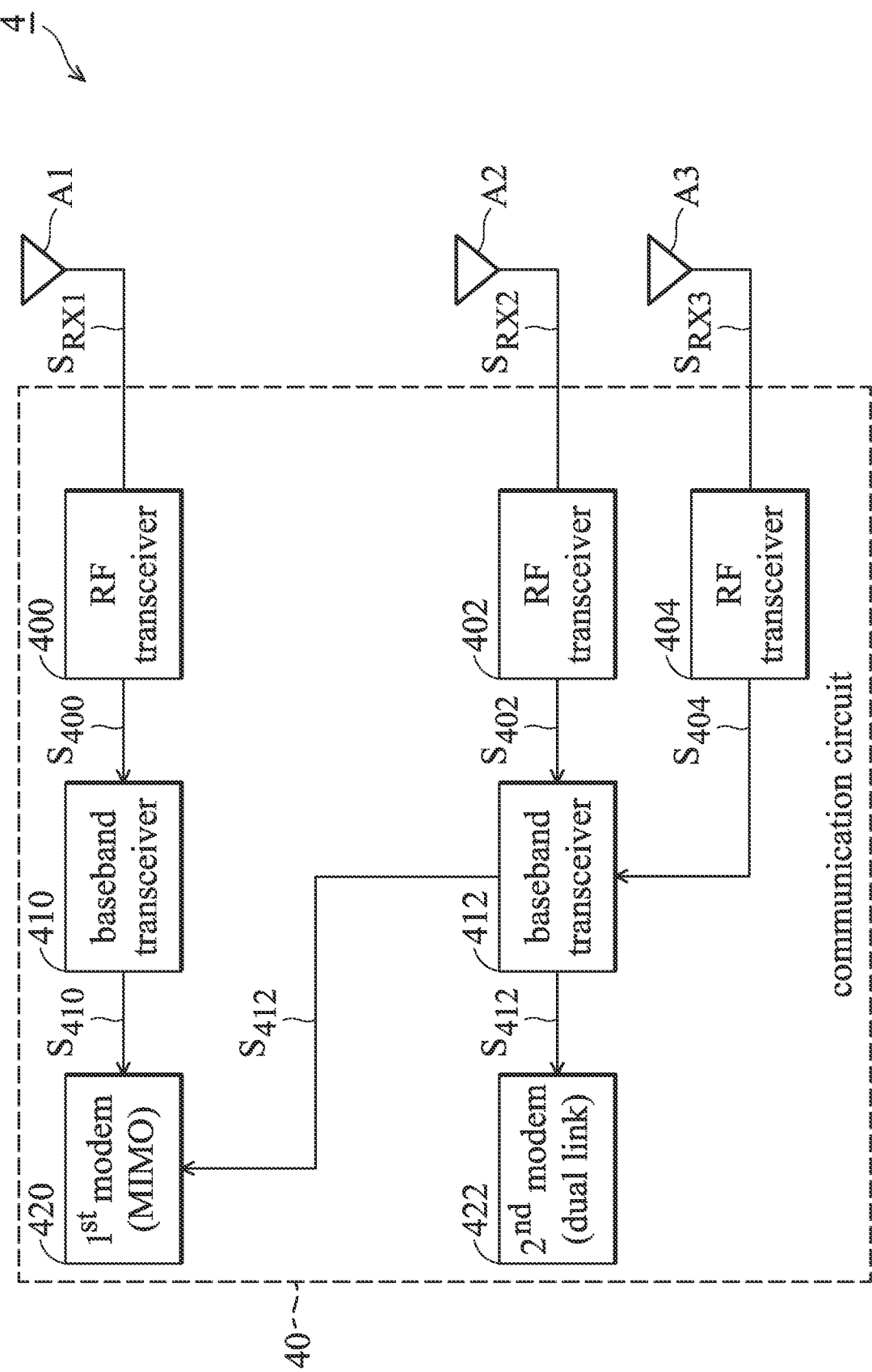
FIG. 4 is a block diagram of a communication circuit 40 according to an embodiment of the invention.

FIG. 4 is a block diagram of a UE 4 (communication device) according to an embodiment of the invention, supporting the MIMO technology, dual-mode, and/or receive antenna diversity as depicted in FIGS. 1 through 3. The UE 4 includes antennas A1 and A2 (first and second antennas) for accepting Radio Frequency (RF) signals $S_{RX1}$ and $S_{RX2}$ for a first communication technology, and includes an antenna A3 (third antenna) for accepting RF signal $S_{RX3}$ for a second communication technology, and a communication circuit 40 for processing the received RF signals $S_{RX1}$, $S_{RX2}$ and $S_{RX3}$. The first communication technology supports the MIMO technology or receive antenna diversity, and may be, for instance, an IEEE 802.11n (Wi-Fi), LTE, WiMAX or HSPA+ system. The second communication technology is a communication technology different from the first communication technology, and may be, for instance, a $2^{nd}$ Generation communication system such as a GSM system, a $3^{rd}$ Generation communication system such as an UMTS and CDMA2000 system, $4^{th}$ Generation communication system such as a LTE and WiMAX system.

The communication circuit 40 may be implemented by an integrated circuit (IC), containing RF transceivers 400, 402, and 404 (first, second, and third RF transceivers), baseband transceivers 410 and 412 (first and second baseband transceivers), and modems 420 and 422 (first and second modem circuits). The antenna A1 is coupled to the RF transceiver 400, the baseband transceiver 410, and subsequently to the $1^{st}$ modem 420. The antenna A2 is coupled to the RF transceiver 402, the baseband transceiver 412, and subsequently to the $1^{st}$ modem 420. The antenna A3 is coupled to the RF transceiver 404, the baseband transceiver 412, and subsequently to the $2^{nd}$ modem 424.

The baseband transceiver 412 is shared between the first and second communication technologies, and may be configured or selected by a selection signal $S_{sel}$ to process a down-converted signal $S_{402}$ for the first communication technology or a down-converted signal $S_{404}$ for the second communication technology. Subsequently, the processed output $S_{412}$ is delivered to the modem 420 or 422 depending on the selected communication technology.

During downlink signal reception, the RF transceivers 400, 402, and 404 are configured to perform signal amplification, down conversion, and other analog filtering processes for received RF signals $S_{RX1}$, $S_{RX2}$ and $S_{RX3}$ to output the down-converted signals $S_{400}$, $S_{402}$ and $S_{404}$, respectively. The baseband transceivers 410 and 412 are configured to perform analog-to-digital conversion and various baseband filtering processes for the down-converted signals $S_{400}$, $S_{402}$, and $S_{404}$ to output the baseband signals $S_{410}$ and $S_{412}$, respectively. The $1^{st}$ and $2^{nd}$ modems 420 and 422 are configured to perform modulation/demodulation, channel estimation and compensation, and other baseband signal processing to baseband signals $S_{410}$ and $S_{412}$. Specifically, the $1^{st}$ modem 420 is configured to perform the digital signal processing for the MIMO and/or the receive antenna diversity schemes, and the $2^{nd}$ modem 422 is configured to perform specific digital signal processing for the $2^{nd}$ communication technology.

The baseband transceiver 412 is shared between the down-converted MIMO/diversity signal S402 for the $1^{st}$ communication technology and the down-converted dual-mode signal S404 for the $2^{nd}$ communication technology. Consequently, only one of the MIMO/diversity and the dual-mode function may be adopted by the communication circuit 40 at a time. When the communication circuit 40 adopts the MIMO/diversity function, the selection signal $S_{sel}$ is utilized to configure or select the baseband transceiver 412 to receive and digitize only the down-converted signal S402. Whereas when the communication circuit 40 adopts the dual-mode function, the selection signal $S_{sel}$ is utilized to configure or select the baseband transceiver 412 to receive and digitize only the down-converted signal S404. The selection of adopting the MIMO/diversity or the dual-mode function is a matter of preference for the user or the network operator. The UE 4 may incorporate software, hardware, or a combination thereof to provide a selection interface (not shown) for the user or the network operator to select or configure the activation and deactivation of the MIMO/diversity and the dual-mode functions.

In some embodiments, the RF transceivers 400, 402, and 404 and the $1^{st}$ and $2^{nd}$ modems 420 and 422 may also be configured by the selection signal $S_{sel}$. For example, when the MIMO/diversity function is activated, the RF transceivers 400 and 402, and the $1^{st}$ modem 420 are enabled by the selection signal $S_{sel}$, while the RF transceivers 404 and the $2^{nd}$ modem 424 are disabled. When the dual-mode function is activated, the RF transceivers 404 and the $2^{nd}$ modem 424 are enabled by the selection signal $S_{sel}$, while the RF transceivers 400 and 402, and the $1^{st}$ modem 420 are disabled.

The $1^{st}$ modem 420 may be configured to a MIMO mode, which separates the mixed signal components in the received signals $S_{RX1}$ and $S_{RX2}$ to recover the original MIMO data in the signals $S_{TX1}$ and $S_{TX2}$. The $1^{st}$ modem 420 may also be configured to a receive diversity mode, which performs signal processing to the received signals $S_{RX1}$ and $S_{RX2}$ based on a selection or a maximal ratio combining scheme to recover the transmitted data in the signal $S_{TX1}$. The selection of the MIMO mode and the receive diversity mode may also be configured by way of the selection interface.

The UE 4 adopts a baseband transceiver shared by MIMO/diversity and dual-mode signals, reducing circuit size, complexity and manufacturing cost, while providing desired MIMO/diversity and dual-mode functions.

Figure 5:
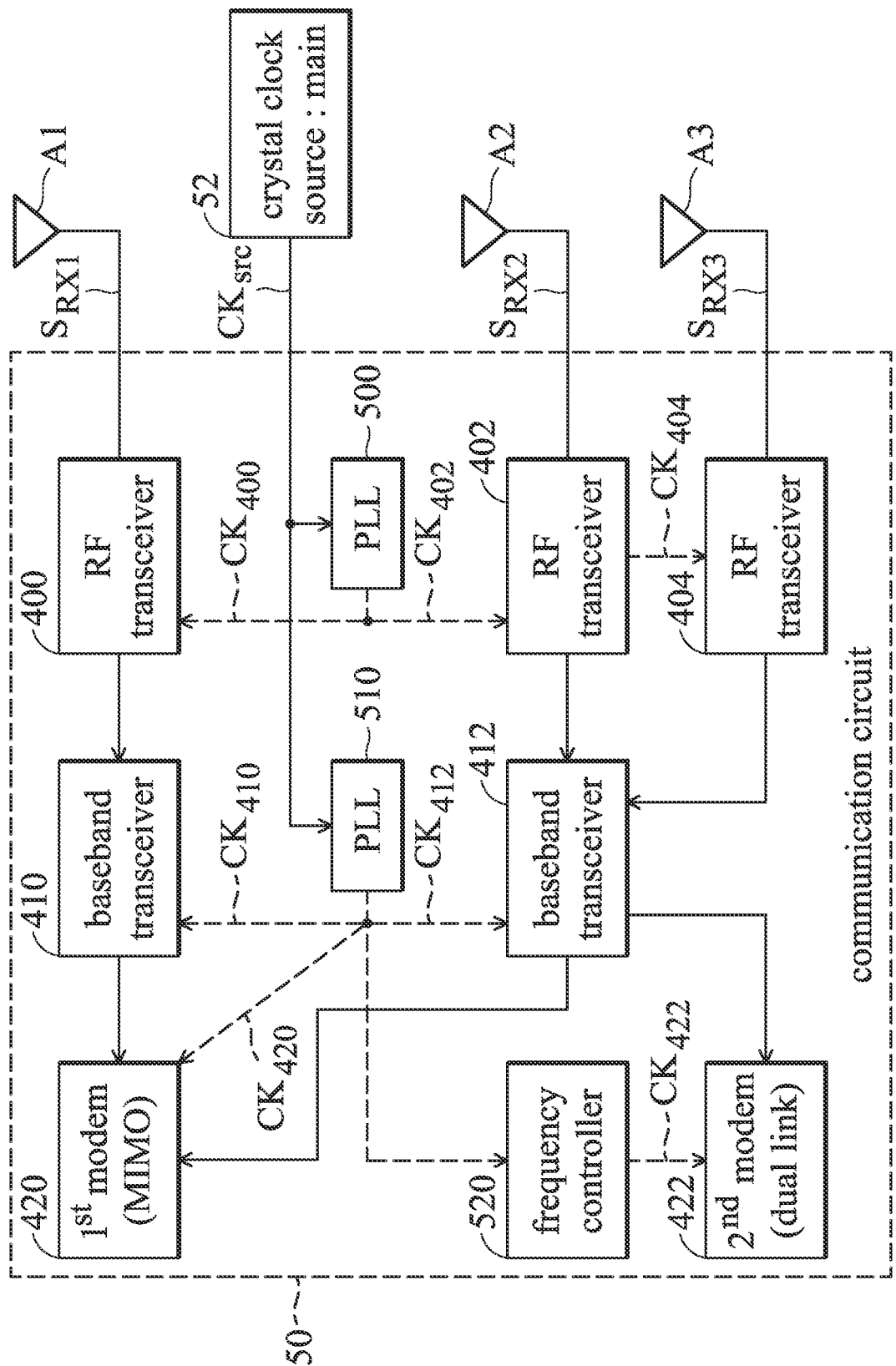
FIG. 5 is a block diagram of a communication circuit 50 according to another embodiment of the invention.

FIG. 5 is a block diagram of a UE 5 (communication device) according to another embodiment of the invention, supporting the MIMO technology, the dual-mode technique, and/or the receive antenna diversity. The circuit arrangement and configuration of UE 5 is identical to that of UE4, except a clock network is depicted in FIG. 5 to further detail the clock signal distribution for the UE 5.

The clock generation and distribution network in UE 5 includes a crystal oscillator 52, a Phase-Locked Loop (PLL) 500, a PLL 510, and a frequency controller 520, adopting the crystal oscillator 52 to provide a common clock source signal $CK_{src}$ for generating and supplying various clocks to the RF transceivers 400, 402, and 404, the baseband transceivers 410 and 412, and modems 420 and 422. The crystal oscillator 52 is coupled to the PLL 500 and 510, of which the latter is further coupled to the frequency controller 520.

Rather than employing a plurality of crystal oscillators to provide for a plurality of source clock signals, the clock generation and distribution network in UE 5 utilizes a single crystal oscillator 52 to produce the common clock source signal $CK_{src}$, and derives a plurality of clock signals according to the common clock source signal $CK_{src}$ for use by various circuits in the communication circuit 50.

The PLL 500 is coupled to the RF transceivers 400, 402, and 404, providing clock signals $CK_{400}$, $CK_{402}$, and $CK_{404}$ to the RF transceivers 400, 402, and 404 respectively. The PLL 502 is coupled to the baseband transceivers 410 and 412 and modems 420 and 422, providing clock signals $CK_{410}$, $CK_{412}$, $CK_{420}$, and $CK_{422}$ to the baseband transceivers 410 and 412 and modems 420 and 422 respectively. The PLL 510 is coupled to the $2^{nd}$ modem 422 through the frequency controller 520 which finely adjusts a frequency difference between the clock signals $CK_{420}$ and $CK_{422}$. The frequency difference accounts for a frequency offset between system clocks in different communication networks.

The PLL 500 may contain more than 2 sub-PLLs therein, one sub-PLL being used to generate and supply the clock signals $CK_{400}$, $CK_{402}$ (first clock signal), the other sub-PLL being used to generate and supply the clock signals $CK_{400}$ (second clock signal). The clock signals $CK_{400}$ and $CK_{402}$ are substantially the same, with a first clock frequency compliant with the operation frequency band of the first communication technology. The clock signal $CK_{404}$ has a second clock frequency compliant with the operation frequency band of the second communication technology. The first and second clock frequencies are different.

The clock signals $CK_{410}$, $CK_{412}$, and $CK_{420}$ are substantially the same. The frequency controller 520 is configured to receive the clock signal $CK_{420}$ (third clock signal) to generate the clock signal $CK_{422}$ (fourth clock signal) based on a phase interpolation technique and provide the clock signal $CK_{422}$ to the $2^{nd}$ modem 422. The clock frequencies of the clock signals $CK_{420}$ and $CK_{422}$ are slightly different. Because the network systems of the $1^{st}$ and $2^{nd}$ communication technology may operate in slightly different system clocks, resulting in the clock difference between the clock signals $CK_{420}$ and $CK_{422}$. The frequency controller 520 compensates for the frequency difference to provide an accurate clock signal $CK_{422}$ to the $2^{nd}$ modem.

The UE 5 adopts a common source clock signal to generate a plurality of clock signals, and then distributes the plurality of clock signals to various RF and baseband circuits, reducing the quantity of crystal oscillators used, and decreasing the manufacturing cost.

The term "or" used herein is intended to mean an inclusive "or" rather than an exclusive "or." That is, unless specified otherwise, or clear from the context, the phrase "X employs A or B" is intended to mean any of the natural inclusive permutations. In addition, the articles "a" and "an" as used in this application and the appended claims should generally be construed to mean "one or more" unless specified otherwise or clear from the context to be directed to a singular form.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general-purpose processor may be a microprocessor, but in the alternative, the processor may be any commercially available processor, controller, microcontroller, or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication circuit, comprising:
   first and second radio frequency (RF) transceivers, configured to down-convert first and second RF signals for a multiple-input and multiple-output (MIMO) technology;
   a third RF transceiver, configured to down-convert a third RF signal for a second telecommunication technology;
   a first baseband transceiver, coupled to the first RF transceiver, configured to digitize the down-converted first RF signal to output a first baseband signal;
   a second baseband transceiver, coupled to the second and third RF transceivers, configured to digitize one of the down-converted second or third RF signals according to a selection signal to output a second baseband signal;
   a first modem circuit, coupled to the first and second baseband transceivers, configured to digitally process the first and second baseband signals using the MIMO technology; and
   a second modem circuit, coupled to the second baseband transceivers, configured to digitally process the second baseband signal using the second telecommunication technology.

2. The communication circuit of claim 1, further comprising:
   first and second phase-locked-loop (PLL) circuits, coupled to the first and second RF transceivers, configured to receive a common clock source signal to respectively generate a first clock signal for use by the first and second RF transceivers, and a second clock signal for use by the third RF transceiver;

wherein the first and second clock signals have different clock frequencies.

3. The communication circuit of claim 2, further comprising:
a third PLL circuit, coupled to the first modem circuit, configured to receive the common clock source signal to generate a third clock signal for use by the first modem; and
a frequency control circuit, coupled to the third PLL circuit and the second modem circuit, configured to receive the third clock signal to generate a fourth clock signal based on phase interpolation, and output the fourth clock signal to the second modem circuit;
wherein the third and fourth clock signals have different clock frequencies.

4. The communication circuit of claim 1, wherein only one of the first and second modem circuits is configured to operate at a time.

5. The communication circuit of claim 1, wherein the selection signal configures the first baseband transceiver to digitize the down-converted second RF signal when operating with the MIMO technology.

6. The communication circuit of claim 1, wherein the selection signal configures the first baseband transceiver to digitize the down-converted third RF signal when operating with the second communication technology.

7. The communication circuit of claim 1, wherein the first modem circuit is configured to combine the first and second baseband signals based on an antenna diversity scheme.

8. A communication device, comprising:
first and second antennas, configured to receive first and second RF signals for a multiple-input and multiple-output (MIMO) technology;
a third antenna, configured to receive a third RF signal for a second communication technology;
a communication circuit, coupled to the first, second, and third antennas, comprising:
first and second radio frequency (RF) transceivers, configured to down-convert the first and second RF signals;
a third RF transceiver, configured to down-convert the third RF signal;
a first baseband transceiver, coupled to the first RF transceiver, configured to digitize the down-converted first RF signal to output a first baseband signal;
a second baseband transceiver, coupled to the second and third RF transceivers, configured to digitize one of the down-converted second or third RF signals according to a selection signal to output a second baseband signal;
a first modem circuit, coupled to the first and second baseband transceivers, configured to digitally process the first and second baseband signals using the MIMO technology; and
a second modem circuit, coupled to the second baseband transceivers, configured to digitally process the second baseband signal using the second telecommunication technology.

9. The communication device of claim 8, further comprising:
a crystal oscillator, configured to provide a common clock source signal;
wherein the IC is further coupled to the crystal oscillator, and further comprises first and second phase-locked-loop (PLL) circuits, coupled to the first and second RF transceivers, configured to receive a common clock source signal to respectively generate a first clock signal for use by the first and second RF transceivers, and a second clock signal for use by the third RF transceiver; and
the first and second clock signals have different clock frequencies.

10. The communication device of claim 9, wherein the IC further comprises:
a third PLL circuit, coupled to the first modem circuit, configured to receive the common clock source signal to generate a third clock signal for use by the first modem; and
a frequency control circuit, coupled to the third PLL circuit and the second modem circuit, configured to receive the third clock signal to generate a fourth clock signal based on phase interpolation, and output the fourth clock signal to the second modem circuit; and
the third and fourth clock signals have different clock frequencies.

11. The communication device of claim 8, wherein only one of the first and second modem circuits is configured to operate at a time.

12. The communication device of claim 8, wherein the selection signal configures the first baseband transceiver to digitize the down-converted second RF signal when operating with the MIMO technology.

13. The communication device of claim 8, wherein the selection signal configures the first baseband transceiver to digitize the down-converted third RF signal when operating with the second communication technology.

14. The communication device of claim 8, wherein the first modem circuit is configured to combine the first and second baseband signals based on an antenna diversity scheme.

* * * * *